(12) United States Patent
Buell et al.

(10) Patent No.: US 7,198,128 B2
(45) Date of Patent: Apr. 3, 2007

(54) TRANSLUCENT BODY PANEL FOR A MOTORCYCLE

(75) Inventors: Erik F. Buell, Mukwonago, WI (US); Michael D. Samarzja, Mukwonago, WI (US); Charles A. Hirsch, Brookfield, WI (US)

(73) Assignee: Buell Motorcycle Company, East Troy, WI (US)

( * ) Notice: Subject to any disclaimer, the term of this patent is extended or adjusted under 35 U.S.C. 154(b) by 273 days.

(21) Appl. No.: 10/881,384

(22) Filed: Jun. 30, 2004

(65) Prior Publication Data

US 2006/0060404 A1   Mar. 23, 2006

(51) Int. Cl.
*B62K 11/00* (2006.01)

(52) U.S. Cl. .................. 180/219; 180/90; 362/473

(58) Field of Classification Search .............. 180/90, 180/219; 362/473, 496
See application file for complete search history.

(56) References Cited

U.S. PATENT DOCUMENTS

| | | | | |
|---|---|---|---|---|
| 4,687,072 A | * | 8/1987 | Komuro | .................... 180/219 |
| 6,116,761 A | * | 9/2000 | Munsey | ...................... 362/485 |
| 6,406,169 B1 | * | 6/2002 | Munsey | ...................... 362/485 |
| 6,616,165 B2 | * | 9/2003 | Tsuji | ....................... 280/288.4 |
| 6,926,110 B2 | * | 8/2005 | Armstrong et al. | ......... 180/219 |
| 2006/0037794 A1 | * | 2/2006 | Riha | .......................... 180/90 |

OTHER PUBLICATIONS

2003 Lightning XB9S, Buell American Motorcycles 2003 Motorcycles, Published prior to Jun. 30, 2003, pp. 5-6.

* cited by examiner

*Primary Examiner*—Tony Winner
(74) *Attorney, Agent, or Firm*—Michael Best & Friedrich LLP

(57) ABSTRACT

A motorcycle having one or more translucent body panels, such as an airbox cover and a flyscreen. The translucent body panels can be sufficiently opaque to mask the components positioned behind the body panel when the motorcycle is viewed from a distance, but yet allow visual inspection of those components when viewed from a position adjacent the motorcycle.

16 Claims, 7 Drawing Sheets

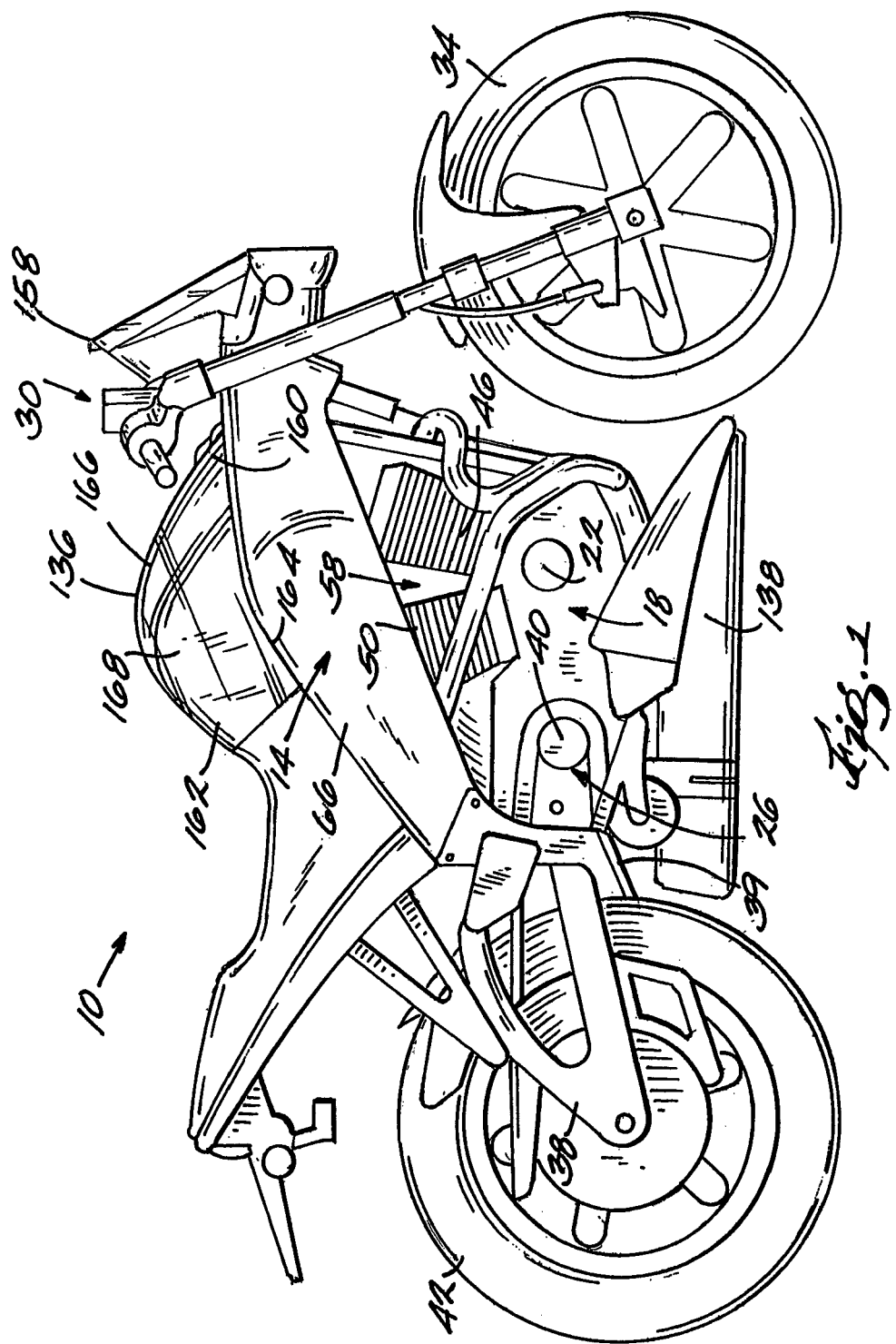

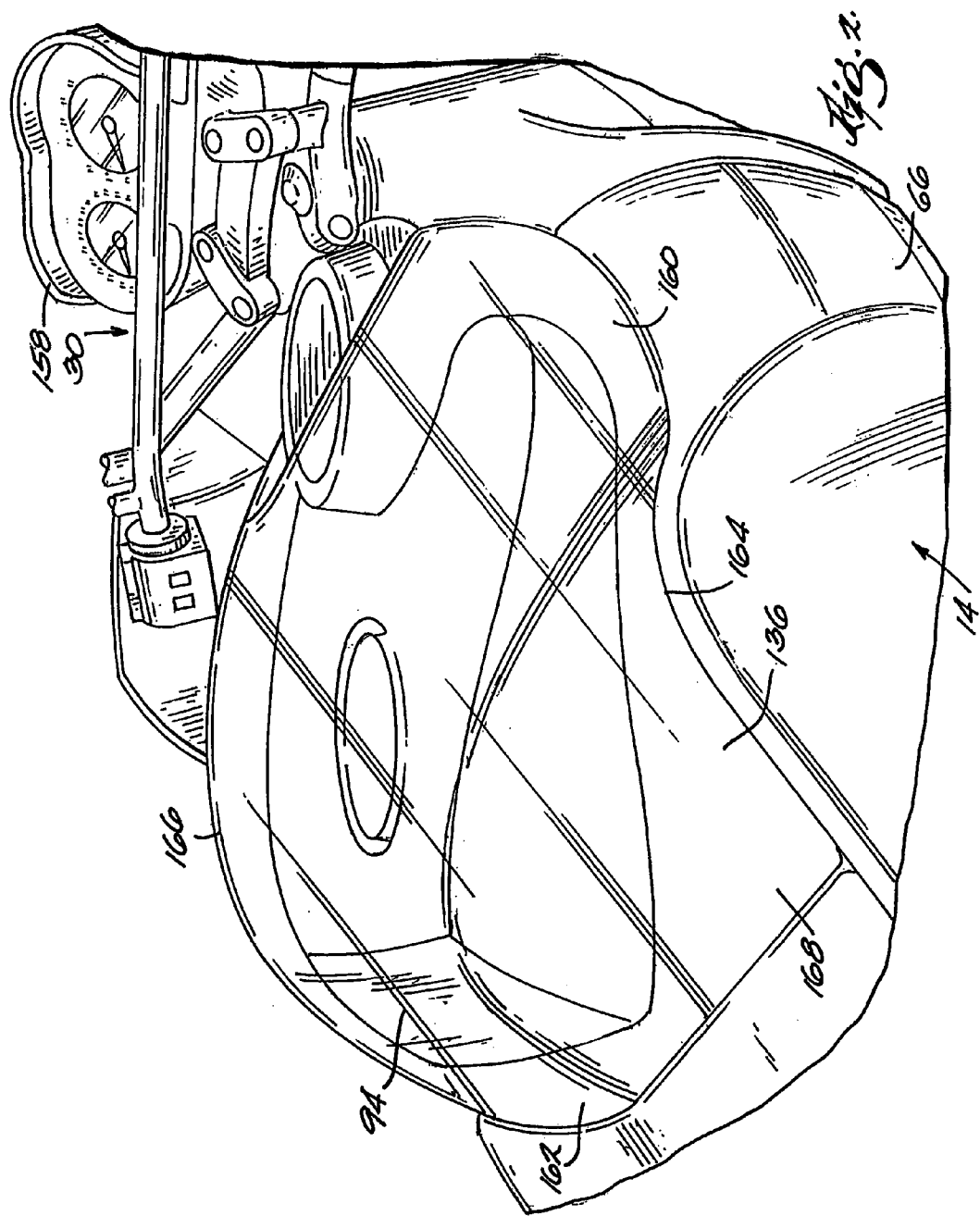

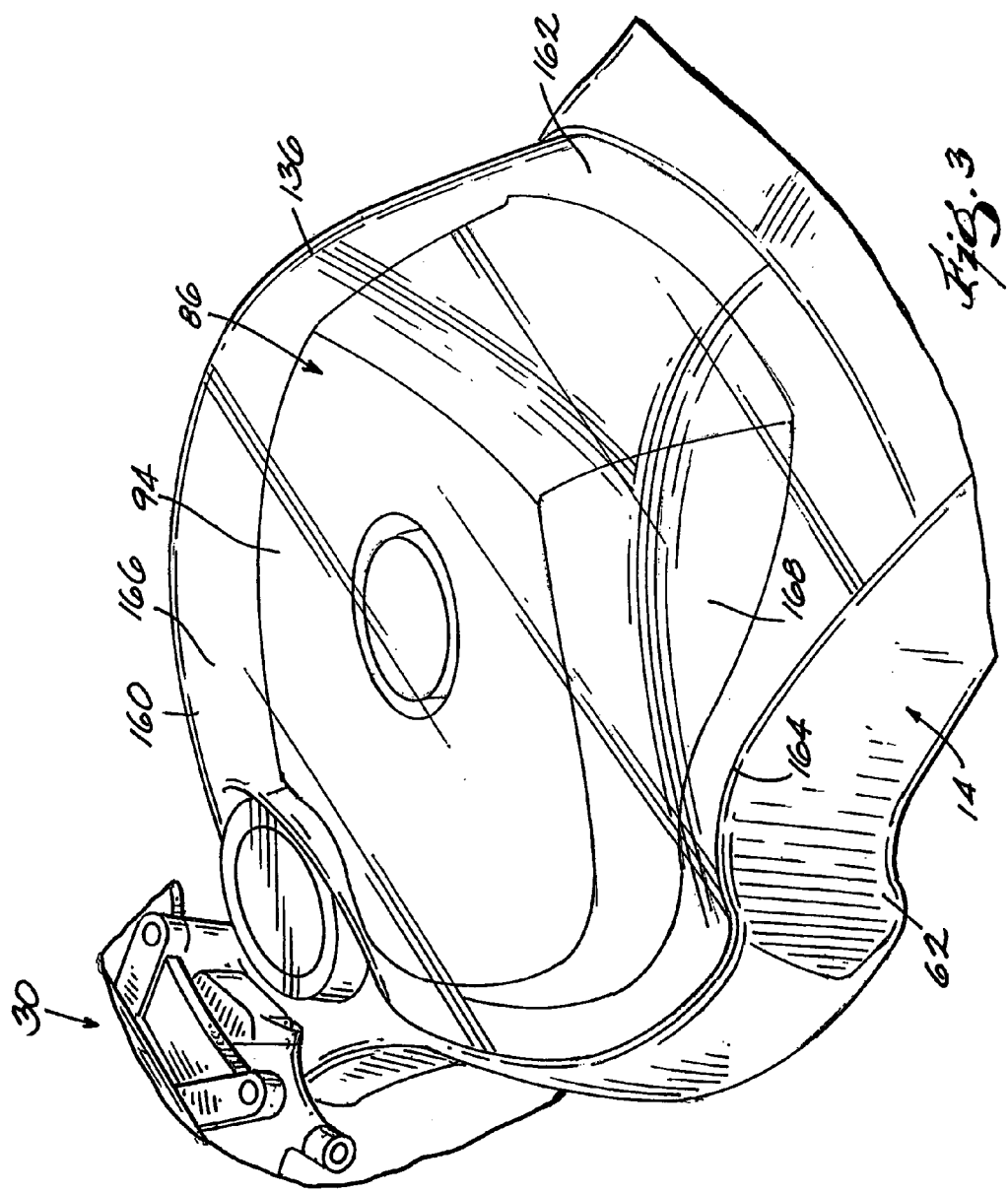

TRANSLUCENT BODY PANEL FOR A MOTORCYCLE

BACKGROUND

Many motorcycles include opaque body panels to cover motorcycle components. The body panels protect the motorcycle components, protect the operator from unintentionally contacting the components, and mask the components from view. Furthermore, the body panels are usually shaped to provide a visually distinct look to the motorcycle. One must remove the panels to view the components positioned behind the panels.

An airbox cover is one example of a body panel. The shape of the airbox is generally driven by function and as such, the airbox may not have the most visually appealing shape. The airbox cover can mask the shape of the airbox. Furthermore, some motorcycles have other devices or components attached to or positioned adjacent the airbox. For example, wiring, tubing, actuators, or other structures may be coupled to the airbox or pass adjacent the airbox. Therefore, the airbox cover can also mask these components from view as well as serve to protect the components and the operator from contacting the components. Like the panels discussed above, conventional airbox covers are opaque thereby preventing any adjacent components from being seen through the cover.

SUMMARY OF THE INVENTION

The present invention is directed to translucent body panels for a motorcycle. One embodiment is directed to a translucent airbox cover. The translucent airbox cover is sufficiently opaque to mask the shape of the airbox and components adjacent the airbox when viewed from a distance, but yet allow visual inspection of the airbox and the components around the airbox when viewed from a position adjacent the motorcycle. This can give the motorcycle a distinctive look and allow visual inspection of an area that is conventionally hidden from view without removal of a body panel.

These and other aspects of the present invention, together with the organization and operation thereof, will become apparent from the following detailed description of the invention when taken in conjunction with the accompanying drawings.

BRIEF DESCRIPTION OF THE DRAWINGS

FIG. 1 is a side view of a motorcycle having an airbox cover according to one embodiment of the present invention.

FIG. 2 is a perspective view of the right side of the motorcycle of FIG. 1 showing the airbox cover in greater detail.

FIG. 7 is a cross-sectional view taken along line 7—7 of FIG. 6.

Figure 3:
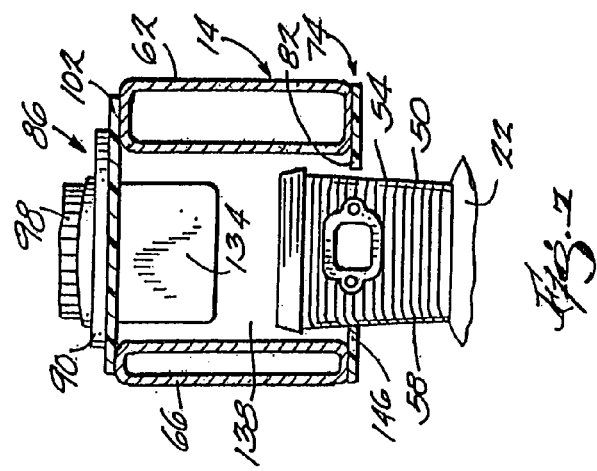
FIG. 3 is a perspective view of the left side of the motorcycle shown in FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

DESCRIPTION OF THE ILLUSTRATED EMBODIMENTS

FIG. 1 illustrates a motorcycle 10 that includes a frame 14 and an engine/transmission assembly 18 connected to the frame 14. The engine/transmission assembly 18 includes an engine 22 and a transmission 26 connected to the engine 22. The motorcycle 10 also includes a steering assembly 30 mounted to the front of the frame 14, a front wheel 34 rotatably mounted to the steering assembly 30 and supporting the front end of the motorcycle 10, a swingarm 38 pivotally interconnected to the transmission 26, and a rear wheel 42 rotatably mounted to the swingarm 38. A drive member, such as a chain or drive belt 39 interconnects the rear wheel 42 with an output shaft 40 of the transmission 26.

Figure 5:
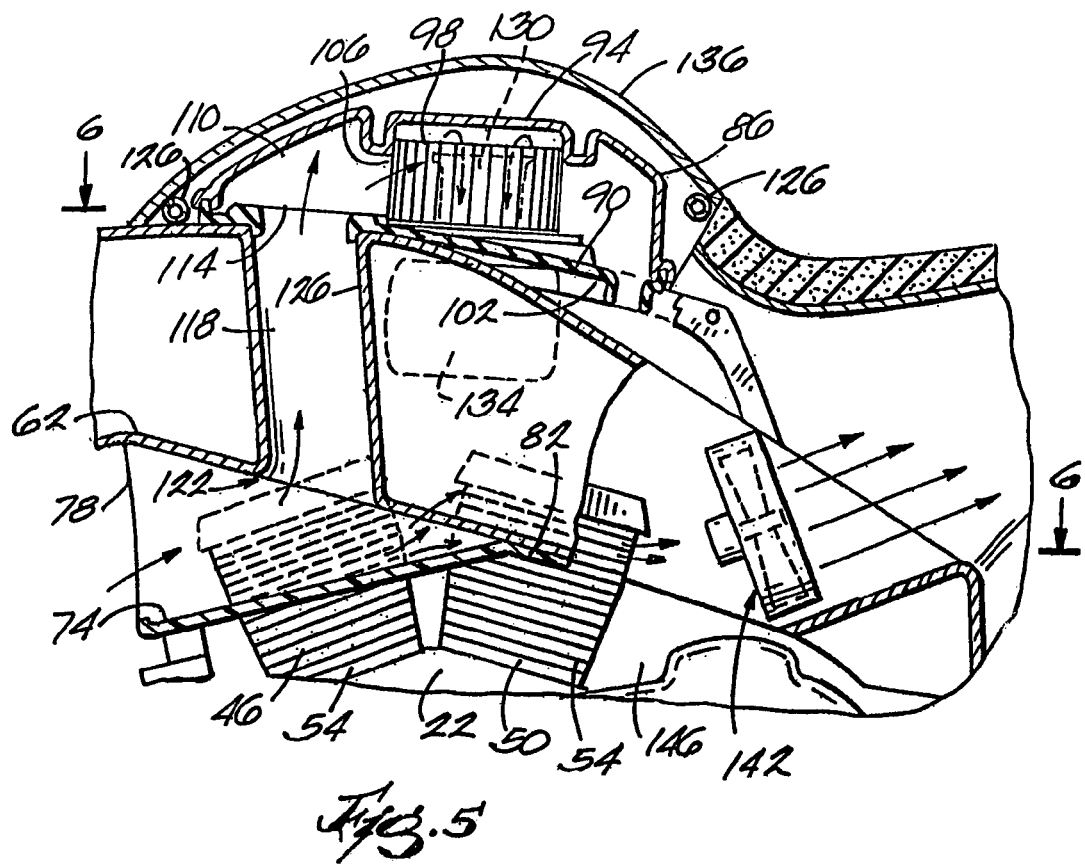
FIG. 5 is a cross-sectional view taken along line 5—5 of FIG. 4.

The engine 22 illustrated in FIG. 1 is a V-twin style engine having a front cylinder 46 and a rear cylinder 50. The cylinders 46, 50 of the engine 22 include left side surfaces 54 as seen in FIG. 5 and right side surfaces 58 shown in FIG. 1. The rear cylinder 50 is disposed behind the front cylinder 46 with respect the direction of travel of the motorcycle 10. With further references to FIGS. 1 and 5, upper portions of the left and right side surfaces 54, 58 of the cylinders 46, 50 are substantially covered by left and right portions 62, 66 of the frame 14, respectively. The left and right portions 62, 66 of the frame 14 are located on opposing sides of a longitudinal axis 70 of the frame 14.

Figure 4:
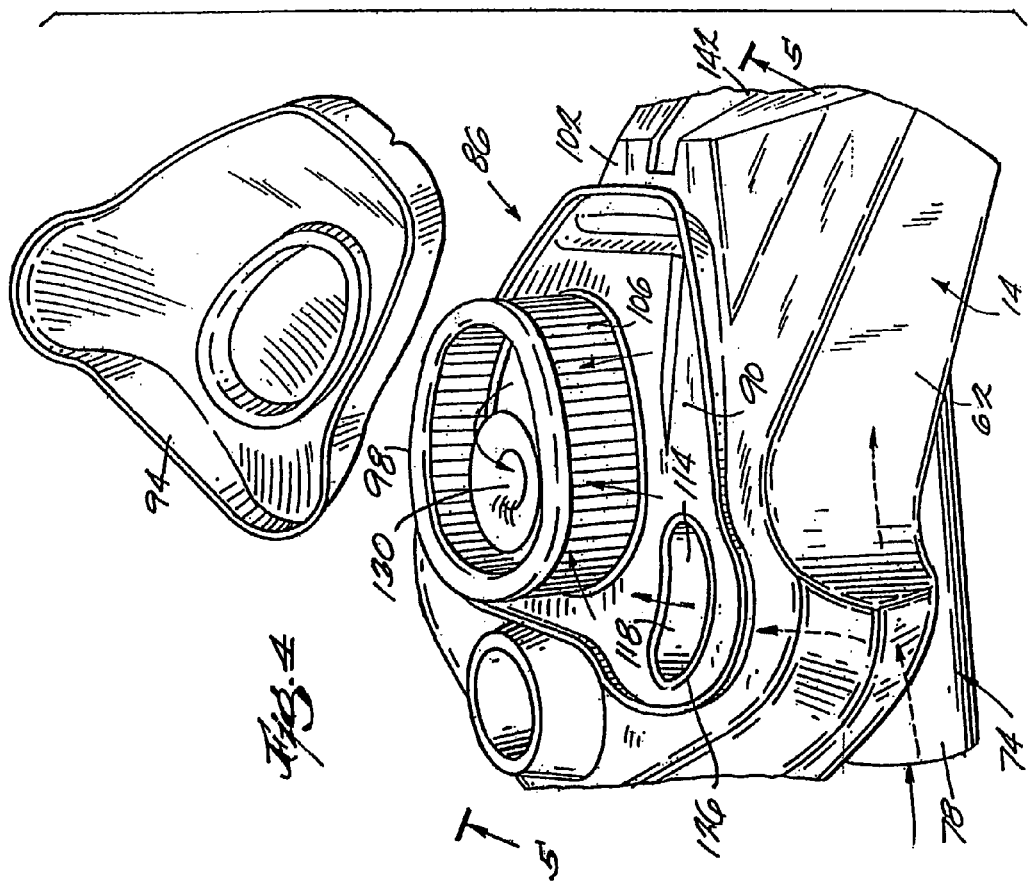
FIG. 4 is a partial exploded view of the airbox on the motorcycle of FIG. 1.

As shown in FIG. 4, the motorcycle 10 also includes a horizontally oriented air scoop 74 that provides air to the front and rear cylinders 46, 50 to cool the engine 22. The air scoop 74 includes a forward opening portion 78 that receives the air from the surrounding atmosphere. Movement of the motorcycle 10 in the forward direction increases the head pressure of the air at the forward opening portion 78 of the air scoop 74 to cause the air to flow in through the air scoop 74 and across the engine 22.

FIGS. 4 and 5 illustrate an airbox 86 that filters air before the air is mixed with fuel for combustion inside of the cylinders 46, 50. The airbox 86 includes a base 90, a top 94, and an air filter 98. The base 90 is mounted to an airbox support 102 on top of the frame 14 and substantially covers the cylinders 46, 50 of the engine 22. The top 94 connects with the base 90 to define a hollow cavity 110. The air filter 98 is positioned within the cavity on top of and near the center of the base 90. The air filter 98 engages the base 90 and the top 94 to restrict air on the outside of the air filter 98 from entering the inside of the air filter 98 except by passing through the wall 106 of the filter 98. The air filter 98 is cylindrically shaped and has a wall 106 made from air permeable material that separates contaminates from air flowing through the wall 106 of the filter 98.

The base 90 includes an inlet 114 that is located outside the perimeter of the filter 98. The inlet 114 provides air to the airbox 86 from the air scoop 74. The inlet 114 is in fluid communication with the air scoop 74 through a passage 118. The passage 118 extends generally perpendicular to the longitudinal axis 70 of the frame 14 and through the left portion 62 of the frame 14. The passage 118 is substantially vertically oriented to prevent rainwater from entering into the airbox 86. The lower portion 122 of the passage 118 is angled upward relative to horizontal to assist in directing airflow from the air scoop 74 into the passage 118.

The airbox 86 also includes an outlet 130 that is located inside the perimeter of the filter 98. The outlet 130 directs filtered air downward through the base 90 and into an air manifold 134. The outlet 130 also extends generally perpendicular to the longitudinal axis 70 of the frame 14 such that the passage 118 and the outlet 130 are both vertically oriented. The air manifold 134 separates the air flow and supplies air to each combustion chamber (not shown) of the cylinders 46, 50.

As shown in FIGS. 1–3, a cover 136 is positioned over the airbox 86. The cover 136 is constructed from a formed translucent plastic material or panel. As such, the cover 136 is also translucent, which allows one to see through the cover 136 to see the top of the airbox 86 or other components positioned under the cover 136, such as wiring, tubing, actuators, and the like. Thus, one could visually inspect these components without having to remove the cover 136. Furthermore, the use of the translucent cover 136 gives the motorcycle a very unique and distinct appearance. Some embodiments can include a light 126 (FIG. 5) positioned beneath the cover 136 to illuminate the cover 136 and the components positioned under the cover 136. The cover 136 includes a front portion 160 and a back portion 162 that is narrower than the front portion. The cover 136 has a periphery 164 that engages the motorcycle. The periphery 164 at least partially defines a convex portion 166 and two concave portions 168. The two concave portions 168 are located on opposite sides of the cover 136 and provide clearance for the legs of the operator.

Figure 8:
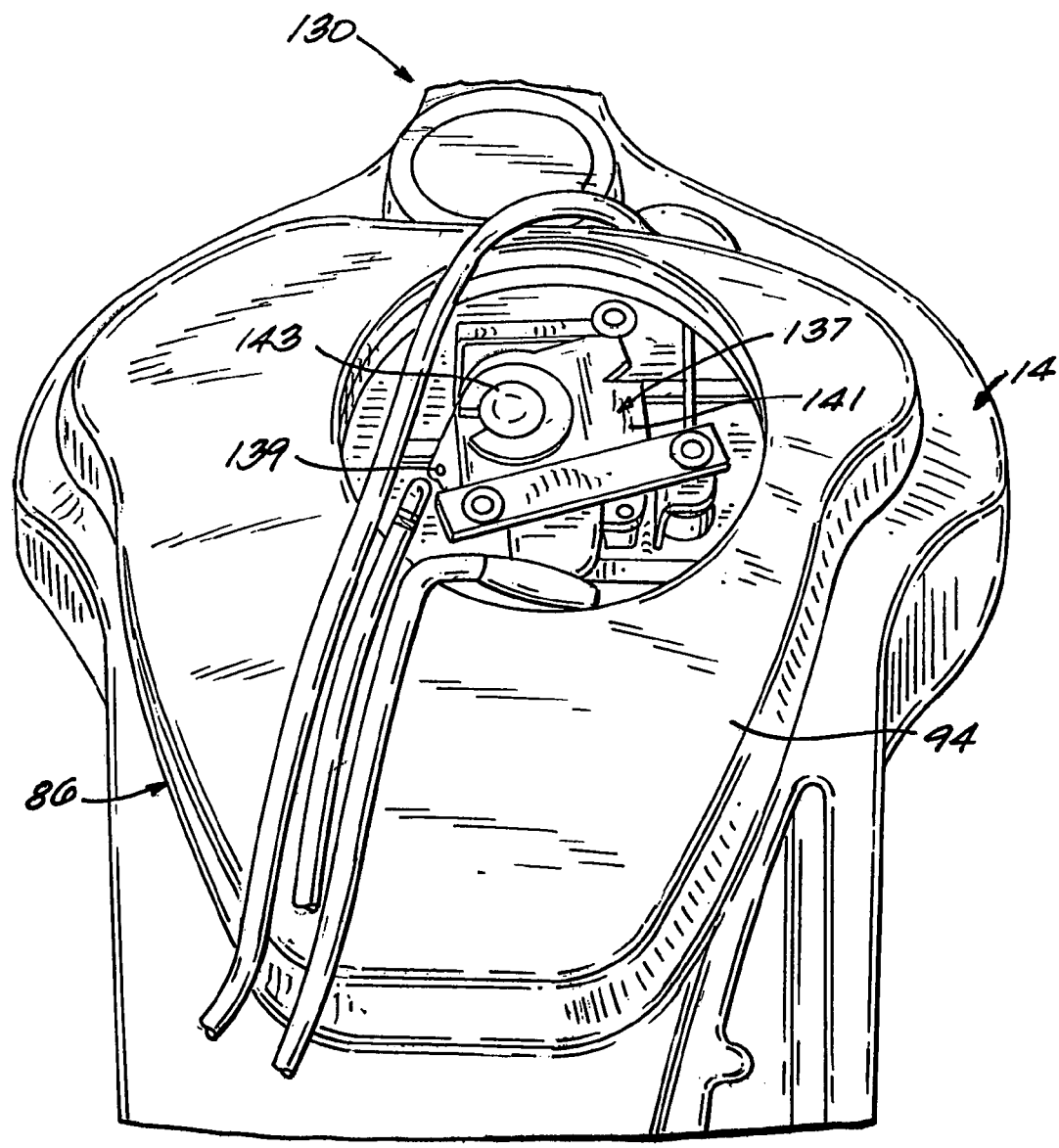
FIG. 8 is a partial perspective view of an actuator positioned on top of the airbox.

As illustrated in FIG. 8, some embodiments have an exhaust valve actuator 137 coupled to the top 94 of the airbox 86 and viewable through the translucent airbox cover 136. The actuator 137 is centrally positioned on top of the airbox assembly 86 and is coupled to an exhaust valve (not shown) within the muffler 138 (FIG. 1) of the motorcycle 10. The actuator 137 includes a motor 141, a motor pulley 143 driven by the motor, and a cable 139 connected to the motor pulley 143. The operation of the motor 141, motor pulley 143 and the cable 137 can be visually inspected through the translucent airbox cover 136. The cable 139 extends through the motorcycle frame 14 toward the exhaust valve. Rotation of the motor pulley 143, which can be observed through the cover 136, moves the cable 139, and actuates the exhaust valve between open and closed positions. Movement of the valve between the open and closed positions changes the torque, the efficiency, and the sound quality of the engine 22.

Figure 6:
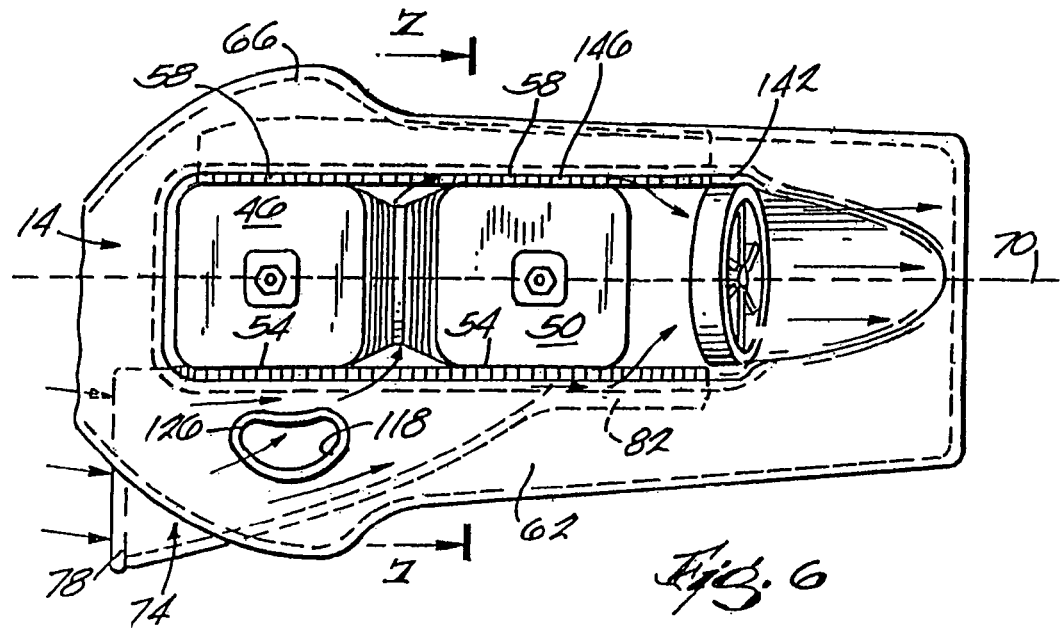
FIG. 6 is a cross-sectional view taken along line 6—6 of FIG. 5.

FIGS. 5 and 6 illustrate the flow pattern of the air that flows into the air scoop 74. The air flows into the forward opening portion 78 of the air scoop 74 in response to the forward head pressure developed by riding the motorcycle 10. If the engine 22 is running, a portion of the airflow in the air scoop 74 is diverted upwardly into the airbox 86 through the passage 118. The diverted air then flows through the air filter 98 and downwardly into the air manifold 134 and into the combustion chambers of the cylinders 46, 50.

The remaining air flow in the air scoop 74 is initially directed across the left side surface of the front cylinder 46 to absorb the heat and lower the temperature of the engine 22. The air flow is again split such that some of the air flows along the left side surface of the rear cylinder 50 and some of the air flows in a transverse direction between the front and rear cylinders 46, 50. The air that flows between the cylinders 46, 50 in then redirected to flow across the right side surface of the rear cylinder 50. The air flowing on the side surfaces 54, 58 of the rear cylinder 50 are combined behind the rear cylinder 50 dispersed above the rear wheel 42 of the motorcycle 10 and into the surrounding atmosphere.

Figure 9:
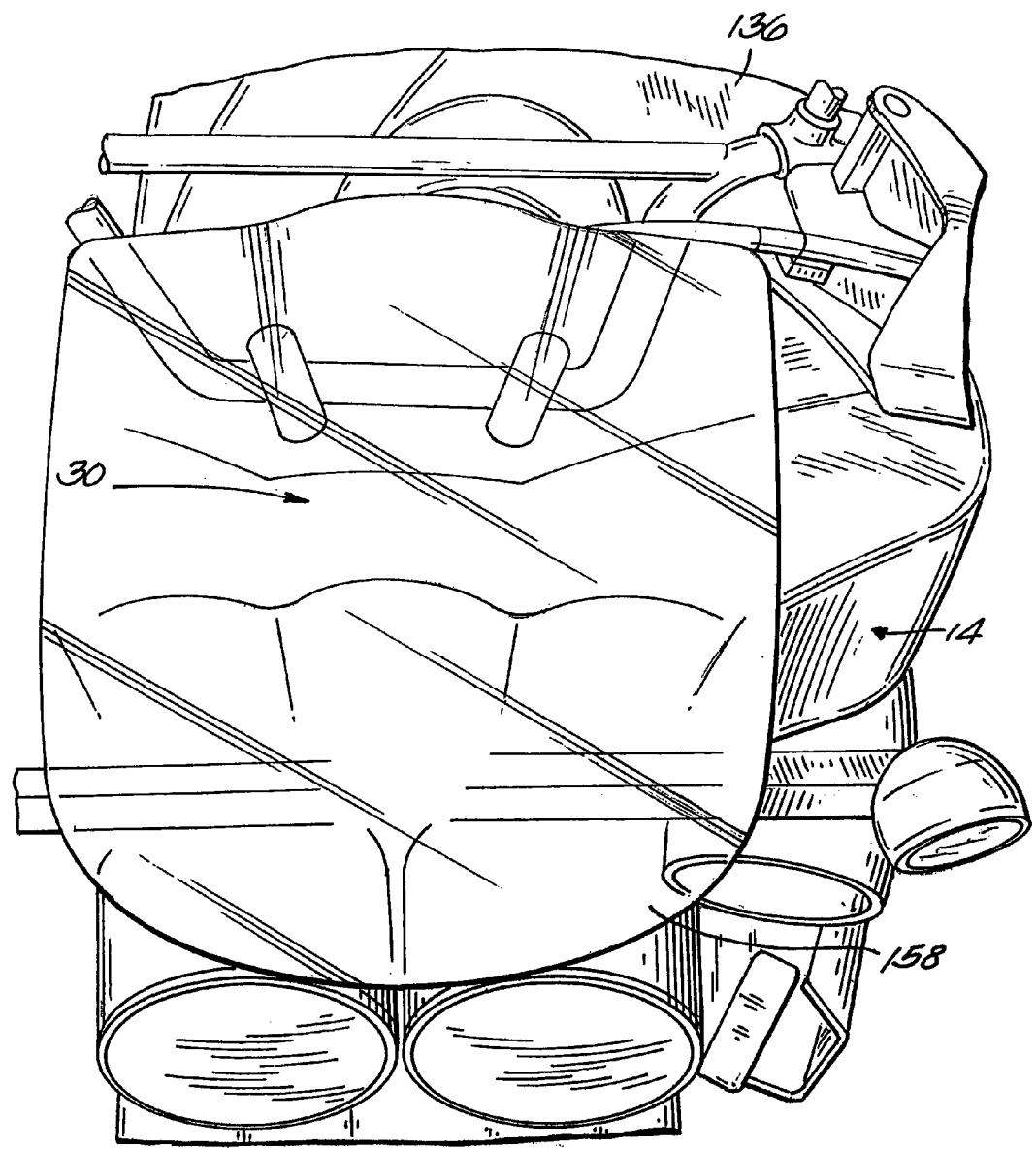
FIG. 9 is a partial perspective view of a translucent flyscreen on the motorcycle of FIG. 1.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, other body panels of the motorcycle can be constructed from translucent materials. Specifically, in some embodiments, the flyscreen 158 is translucent. As shown in FIG. 9, the flyscreen 158 is positioned on the steering assembly in front of the instrument pod. The translucent flyscreen 158 provides a distinct look and allows items to be viewed through the panel without removing it.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

Various features of the invention are set forth in the following claims.

What is claimed is:

1. A motorcycle comprising:
    a frame;
    a steering assembly mounted to a front portion of the frame and pivotable with respect to the frame to steer the motorcycle;
    a front wheel rotatably mounted to the steering assembly and supporting a front portion of the motorcycle;
    a rear wheel rotatably interconnected with a rear portion of the frame and supporting a rear portion of the motorcycle;
    an engine/transmission assembly supported by the frame, the engine/transmission assembly being interconnected with the rear wheel to drive rotation of the rear wheel;
    a translucent body panel coupled to the frame; and
    an airbox coupled to the frame and positioned adjacent the engine, the airbox adapted to provide air to the engine, wherein the translucent body panel is positioned to at least partially cover the airbox.

2. The motorcycle of claim 1, wherein the frame has a longitudinal axis and the motorcycle further comprises an airbox delivery system that provides air to the airbox, the airbox delivery system including a passage that is substantially perpendicular to the longitudinal axis and that is in fluid communication with the airbox, the passage directing the flow of air upwardly into the airbox.

3. The motorcycle of claim 1, further comprising an exhaust valve actuator coupled to a top of the airbox and viewable through the translucent body panel.

4. The motorcycle of claim 1, further comprising a translucent flyscreen coupled to the steering assembly.

5. The motorcycle of claim 1, wherein the airbox includes:
   a base mounted to the frame;
   an air filter positioned on the base and having a wall made from air permeable material to separate contaminates from air flowing through the wall of the filter;
   a top coupled to the base to define a hollow cavity, the top positioned adjacent the air filter such that air on the outside of the air filter is substantially restricted from entering the inside of the air filter except through the wall of the filter;
   an inlet coupled to the base on an area of the base located outside a perimeter of the filter and providing air to the cavity; and
   an outlet coupled to the base in a location positioned inside the perimeter of the filter to direct filtered air downward through the base and into the engine.

6. The motorcycle of claim 1, further comprising a light positioned beneath the translucent body panel to illuminate the body panel.

7. A motorcycle comprising:
   a frame;
   a steering assembly mounted to a front portion of the frame and pivotable with respect to the frame to steer the motorcycle;
   an instrument pod coupled to the steering assembly;
   a translucent flyscreen coupled to the steering assembly and positioned in front of the instrument pod;
   a front wheel rotatably mounted to the steering assembly and supporting a front portion of the motorcycle;
   a rear wheel rotatably interconnected with a rear portion of the frame and supporting a rear portion of the motorcycle; and
   an engine/transmission assembly supported by the frame, the engine/transmission assembly being interconnected with the rear wheel to drive rotation of the rear wheel.

8. The motorcycle of claim 7, further comprising:
   an airbox coupled to the frame; and
   a translucent body panel coupled to the frame and positioned over the airbox.

9. The motorcycle of claim 8, wherein the flyscreen and the translucent body panel are the same color.

10. The motorcycle of claim 8, further comprising an exhaust valve actuator coupled to a top of the airbox and viewable through the translucent body panel.

11. The motorcycle of claim 8, wherein the airbox further comprises:
    a base mounted to the frame;
    an air filter positioned on the base and having a wall made from air permeable material to separate contaminates from air flowing through the wall of the filter;
    a top coupled to the base to define a hollow cavity, the top positioned adjacent the air filter such that air on the outside of the air filter is substantially restricted from entering the inside of the air filter except through the wall of the filter;
    an inlet coupled to the base on an area of the base located outside a perimeter of the filter and providing air to the cavity; and an outlet coupled to the base in a location positioned inside the perimeter of the filter to direct filtered air downward through the base and into an engine.

12. The motorcycle of claim 8, further comprising a light positioned beneath the translucent body panel to illuminate the body panel.

13. A cover for an airbox that filters air before the air is mixed with fuel for combustion inside of a motorcycle engine mounted to a frame of the motorcycle, the airbox including a housing mounted to the frame and defining a hollow cavity; an air filter positioned within the housing and having a wall made from air permeable material to separate contaminants from air flowing through the wall of the filter; an inlet providing air to the cavity; and an outlet directing filtered air from the cavity and into the engine, the cover comprising:
    a formed translucent panel adapted to be coupled to the frame and adapted to cover at least a portion of the airbox.

14. The cover of claim 13, further comprising a light positioned adjacent the formed translucent panel.

15. The cover of claim 13, wherein the formed translucent panel has a front portion and a back portion, the front portion having a greater width than back portion.

16. The cover of claim 13, wherein the formed translucent panel has a periphery that engages the motorcycle, the periphery at least partially defined by a convex portion and two concave portions.

* * * * *